(12) United States Patent
Mickelsen et al.

(10) Patent No.: US 9,433,863 B2
(45) Date of Patent: Sep. 6, 2016

(54) VIDEO PROCESSING USING CONCURRENT OUTCOME SIMULATION THREADS

(71) Applicant: ECHOSTAR TECHNOLOGIES L.L.C., Englewood, CO (US)

(72) Inventors: Jeremy Mickelsen, Denver, CO (US); Adam Schafer, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 422 days.

(21) Appl. No.: 13/770,450

(22) Filed: Feb. 19, 2013

(65) Prior Publication Data

US 2014/0187332 A1   Jul. 3, 2014

Related U.S. Application Data

(60) Provisional application No. 61/747,557, filed on Dec. 31, 2012.

(51) Int. Cl.
*A63F 13/12* (2006.01)
*A63F 13/355* (2014.01)
*A63F 13/47* (2014.01)
*A63F 13/55* (2014.01)

(52) U.S. Cl.
CPC .............. *A63F 13/355* (2014.09); *A63F 13/47* (2014.09); *A63F 13/55* (2014.09)

(58) Field of Classification Search
None
See application file for complete search history.

(56) References Cited

U.S. PATENT DOCUMENTS

| | | | | |
|---|---|---|---|---|
| 4,569,026 A * | 2/1986 | Best | ............................... | 715/716 |
| 4,752,836 A * | 6/1988 | Blanton et al. | ............... | 386/201 |
| 5,358,259 A * | 10/1994 | Best | ................................ | 463/31 |
| 5,848,934 A * | 12/1998 | Shiels et al. | ...................... | 463/9 |
| 6,299,535 B1 * | 10/2001 | Tanaka | .............................. | 463/31 |
| 6,544,040 B1 * | 4/2003 | Brelis et al. | .................. | 434/236 |
| 6,761,633 B2 * | 7/2004 | Riendeau et al. | .............. | 463/16 |
| 7,713,126 B2 * | 5/2010 | Suzuki et al. | ................... | 463/31 |
| 2001/0049301 A1 * | 12/2001 | Masuda et al. | .................. | 463/33 |
| 2002/0086724 A1 * | 7/2002 | Miyaki et al. | .................... | 463/9 |
| 2003/0195044 A1 * | 10/2003 | Narita | ............................. | 463/43 |
| 2004/0091848 A1 * | 5/2004 | Nemitz | .......................... | 434/365 |
| 2005/0107145 A1 * | 5/2005 | Karashima et al. | .............. | 463/8 |
| 2012/0004041 A1 * | 1/2012 | Pereira et al. | .................. | 463/42 |
| 2014/0141888 A1 * | 5/2014 | Pavlish | ........................... | 463/42 |

* cited by examiner

*Primary Examiner* — Tramar Harper
(74) *Attorney, Agent, or Firm* — Ingrassia Fisher & Lorenz, P.C.

(57) ABSTRACT

A method of processing video information is presented here. The method may begin by executing, with at least one processor, a plurality of concurrent simulation threads for an interactive video application, wherein each of the concurrent simulation threads corresponds to a predicted outcome of the video application. The method may continue by receiving user input intended to control the interactive video application, processing at least one of the concurrent simulation threads in response to the received user input to obtain an intended outcome of the video application, and providing the intended outcome of the video application for presentation to a user.

10 Claims, 4 Drawing Sheets

VIDEO PROCESSING USING CONCURRENT OUTCOME SIMULATION THREADS

CROSS-REFERENCE TO RELATED APPLICATION

This application claims the benefit of U.S. provisional patent application Ser. No. 61/747,557, filed Dec. 31, 2012.

TECHNICAL FIELD

Embodiments of the subject matter described herein relate generally to video and graphics processing techniques. More particularly, embodiments of the subject matter relate to the use of simulation threads in the context of a video game system.

BACKGROUND

Video processing technology can be applied to a variety of different applications. For example, video games utilize well-known video processing and graphics rendering techniques to generate and present interactive content to end users. The popularity of the Internet has led to an increased interest in network-based, server-hosted, and online video games (collectively referred to herein as "server-based" video games). Server-based video games enable the host entity to provide, maintain, and update the core video game software in a centralized manner, while allowing any number of online users to access and play the hosted video games. A server-based video game could be provided in the web browser of a client system, or it could rely on a local client application that is particularly written to support the server-based video game, as is well understood.

Delays due to network routing and/or other sources of communication latency can impact the playability of server-based video games, and can adversely affect the accuracy of rendered graphics relative to actual user commands. For example, if a player is supposed to enter a "jump" command before his game character reaches a certain defined point, a properly timed "jump" action (from the perspective of the player at a client system) may be processed by the server system in a delayed manner, resulting in the server system rendering and returning a failed jump maneuver for presentation to the player. The time lag experienced by the end user may be associated with client-to-server delay corresponding to the transmission of user control commands, in addition to server-to-client delay corresponding to the provision of the resulting video data or instructions that are needed to present the desired outcome to the client system. This time lag may vary from one user to another, depending upon the specific operating conditions, the data routing path between the client system and the server system, the performance capabilities of the client system, and other factors.

BRIEF SUMMARY

A method of processing video information is presented here. The method executes, with at least one processor, a plurality of concurrent simulation threads for an interactive video application, wherein each of the concurrent simulation threads corresponds to a predicted outcome of the video application. The method continues by receiving user input intended to control the interactive video application, processing at least one of the concurrent simulation threads in response to the received user input to obtain an intended outcome of the video application, and providing the intended outcome of the video application for presentation to a user.

A video processing system is also presented here. The system includes a communication interface, a processing architecture, and a computer readable medium operatively associated with the processing architecture. The communication interface receives user control commands initiated at a client system at an actuation time, wherein the user control commands are associated with user interaction with a video game application hosted by the video processing system. The processing architecture has at least one processor, and the computer readable medium stores executable instructions that, when executed by the processing architecture, cause the processing architecture to perform a method that involves executing a plurality of concurrent simulation threads for the interactive video game application, wherein each of the concurrent simulation threads corresponds to a predicted state of the video game application. The method selects at least one of the concurrent simulation threads based on a user control command received by the communication interface, and processes the selected simulation threads to interpolate an intended outcome of the video game application. The method continues by rendering the intended outcome of the video game application, and providing the rendered intended outcome to the client system.

Also provided is a method of processing video information for a video game system having a server system and a client system. The method begins by executing, with at least one processor of the server system, a first simulation thread for an interactive video game application and a second simulation thread for the interactive video game application, wherein the first simulation thread represents a first potential game scenario based on a first anticipated user control command, and wherein the second simulation thread represents a second potential game scenario based on a second anticipated user control command. The method continues by receiving a user control command at the server system, wherein the user control command originates at the client system. The method continues by processing the first simulation thread and the second simulation thread in response to the received user control command to obtain an intended game scenario, rendering the intended game scenario with the server system, and providing the rendered intended game scenario to the client system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
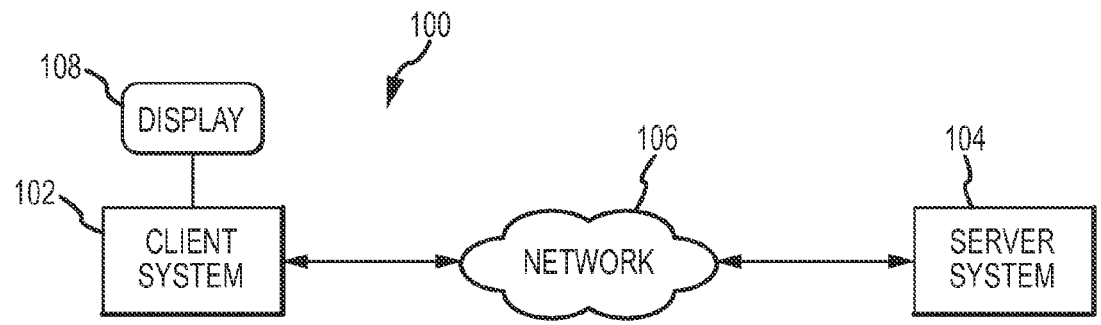
FIG. 1 is a schematic representation of an embodiment of a video processing and presentation system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or processor-executed. In practice, one or more processor devices can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in any processor-readable non-transitory medium or tangible element. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like. A software-based application or program may be preloaded in an electronic device, installed from a media product, or downloaded to the device via computer networks such as the Internet, an intranet, a LAN, or the like.

According to various embodiments, concurrent simulation threads for a video application (such as a video game) are created and executed to predict possible outcomes that might occur in response to actual user commands. The simulation threads may have variables or parameters that bound the range of possible outcomes for any user input in a given window of time, which may be selected in accordance with a measured or estimated client-to-server latency. As actual user control commands are received, the bounding simulation threads can be adjusted, updated, or terminated, and new simulation threads can be created (as needed) to continuously track the possible outcomes for user input in the pipeline. Thus, delay associated with the transmission and receipt of user-entered commands can be accounted for.

In some client-server embodiments, for a given video game or simulation, the delay between the client system and the server system is measured or estimated. This delay could be calculated as one-half of a measured round trip "ping" between the client device and the server device. The server system creates and executes the simulation threads based on the determined delay and based on the range of potential user control command inputs. For inputs that can be interpolated (such as game character position), the position limits can be processed as separate simulation threads, rather than simulating the full spectrum of potential input combinations. The simulation threads may contain a limited model of the actual game playing scenario, where the model is relatively easy and quick to process and render. As the actual user inputs are received, the simulation threads are reconciled with the actual inputs, and the desired outcome and feedback is rendered for presentation to the client device.

Turning now to the figures and with initial reference to FIG. 1, an exemplary embodiment of a video processing and presentation system 100 can be utilized to provide interactive video content to one or more media presentation devices. Although not always required, the following description assumes that the video information and content handled by the system 100 represents the information and content associated with a video game application. This particular embodiment of the system 100 includes a client system 102 and a server system 104 that communicate with each other using a data communication network 106. For purposes of this description, the client system can be realized as one or more computing devices, one or more components, a system, an appliance, or the like, which is suitably configured to receive, process, render, and/or play video game content for one or more users. In practice, the client system 102 may be implemented with any number of media presentation or computing devices, including, without limitation: a desktop computer; a portable computer; a handheld computer; a mobile telephone; a personal digital assistant; a video game console, a mobile video game device; a media server; a mobile media player device; a web-enabled audio/visual component; a medical device; a web-enabled household appliance; a video services receiver such as a set-top box; a television component; etc.

In many embodiments, the client system 102 is a general purpose computing device that includes suitable video processing and graphics capabilities. The illustrated embodiment of the client system 102 cooperates with a display element 108, which may be a separate physical component or a feature that is integrated with the client system 102. The client system 102 can present video game content to a user on the display element 108, using conventional video processing and graphics rendering technology and/or using a suitably configured client application that is specific to the particular video game, as is well understood. Although not depicted in FIG. 1, the client system 102 may include or cooperate with at least one speaker, audio transducer, or other sound-generating element that supports the presentation of audio content.

The server system 104 may be provided to host one or more video game applications that can be accessed by the client system 102. In this regard, the server system 104 may represent an online video game server that processes video game applications to provide corresponding video game content to the client system 102 via the network 106. In accordance with a typical online gaming environment, the server system 104 renders the game content to be presented at the client system 102, and the server system 104 receives, processes, and responds to user-initiated control commands that are communicated from the client system 102 to the server system 104 over the network 106. In other embodiments, the client system 102 renders the game content based on data received from the server system 104. In various embodiments, the server system 104 is a general purpose computing device that includes suitable video processing and graphics capabilities, along with the technology and functionality described in more detail herein.

The network 106 is any digital or other communications network capable of transmitting messages between senders and receivers (e.g., the client system 102 and the server system 104). In various embodiments, the network 106 includes any number of public or private data connections, links or networks supporting any number of communications protocols. The network 106 may include the Internet, for example, or any other network based upon TCP/IP or other conventional protocols. In various embodiments, the network 106 also incorporates a wireless and/or wired telephone network, such as a cellular communications network for communicating with mobile phones, personal digital assistants, and/or the like. The network 106 may also incorporate any sort of wireless or wired local area networks, such as one or more IEEE 802.3 and/or IEEE 802.11 networks.

The client system 102 and the server system 104 are able to communicate in any manner with the network 106. Such communication may take place over a wide area link that includes the Internet and/or a telephone network, for example; in other embodiments, communications between the client system 102 and the server system 104 may take place over one or more wired or wireless local area links that are conceptually incorporated within the network 106. In various equivalent embodiments, the client system 102 and the server system 104 may be directly connected via any sort of cable (e.g., an Ethernet cable or the like) with little or no other network functionality provided.

Figure 2:
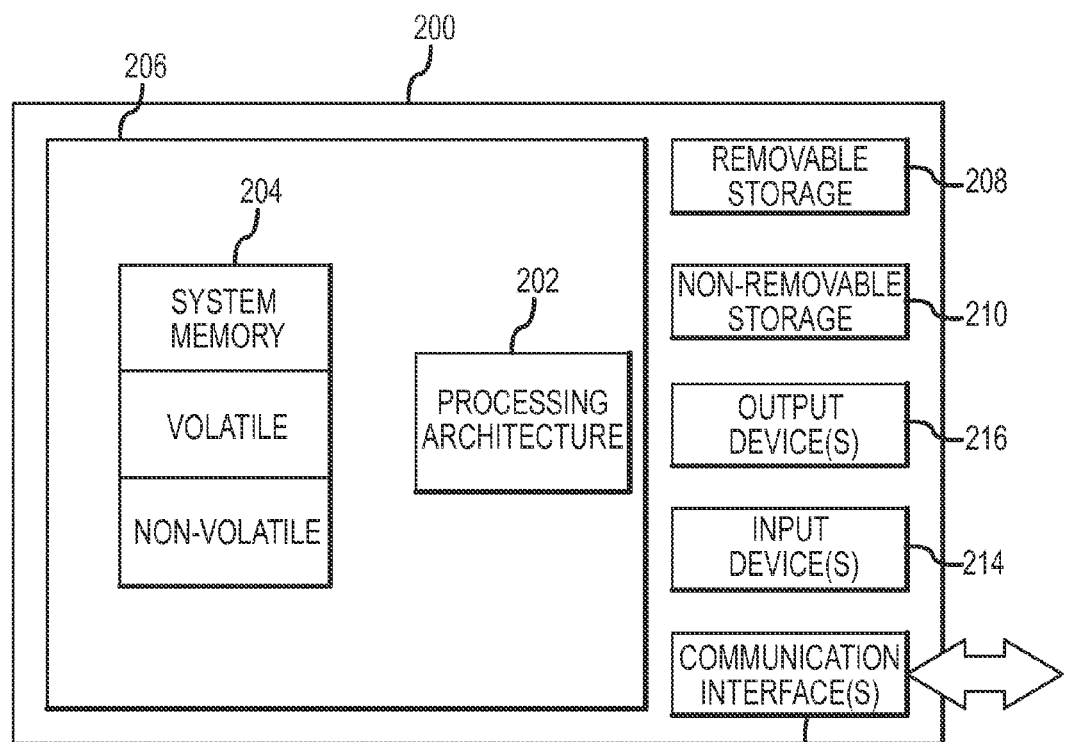
FIG. 2 is a schematic representation of an embodiment of a computer-based system, which may be configured for use as a client system or a server system in a video processing system.

As mentioned above, certain embodiments of the system 100 utilize components that are based upon computing device platforms. In this regard, FIG. 2 is a schematic representation of an exemplary embodiment of a computing device 200 that is configured to support the video processing techniques and methodologies described herein. It should be appreciated that the client system 102 and the server system 104 shown in FIG. 1 may be generally configured as shown and described for the computing device 200. The illustrated computing device 200 is only one example of a suitable implementation, and it is not intended to suggest any limitation as to the scope of use or functionality of any practical embodiment. The computing device 200 and certain aspects of the exemplary embodiments may be described in the general context of computer-executable instructions, such as program modules, application code, or software executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

The computing device 200 typically includes at least some form of tangible computer-readable or processor-readable media. In this regard, processor-readable media can be any available media that can be accessed by the computing device 200 and/or by applications executed by the computing device 200. By way of example, and not limitation, processor-readable media may comprise tangible computer storage media, which may be volatile, nonvolatile, removable, or non-removable media implemented in any method or technology for storage of information such as processor-executable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can accessed by the computing device 200.

Referring again to FIG. 2, in its most basic configuration, the computing device 200 typically includes at least one processing architecture 202 and a suitable amount of memory 204. This basic configuration is identified in FIG. 2 by reference number 206. The processing architecture 202 includes one or more processors, and is preferably configured to execute and carry out processor-executable instructions associated with the model processing, rendering (which may be optional), and presentation techniques, operations, and methods described herein. Accordingly, processor-readable media used by the computing device 200 is accessible by the processing architecture 202, and the processor-readable media stores the appropriate processor-executable instructions needed to support the various techniques and methodologies described herein.

Depending on the exact configuration and type of computing device 200, the memory 204 may be volatile (such as RAM), non-volatile (such as ROM, flash memory, etc.) or some combination of the two. Additionally, the computing device 200 may also have additional features/functionality. For example, the computing device 200 may also include additional storage (removable and/or non-removable) including, but not limited to, magnetic or optical disks or tape. Such additional storage is represented in FIG. 2 by the removable storage 208 and the non-removable storage 210. The memory 204, the removable storage 208, and the non-removable storage 210 are all examples of computer storage media as defined above. One or more memory devices or elements of the computing device 200 can be used to store data and information as necessary to support the various techniques and methodologies described here.

The computing device 200 may also include or support one or more communication interface(s) 212 that allow the computing device 200 to communicate with other devices, such as other networked computing devices, media or content sources, or the like. Depending upon the implementation, the communication interface(s) 212 may include, without limitation, suitably configured interfaces that allow the computing device 200 to communicate with a network such as the Internet, external databases, external memory devices, and the like. The communication interfaces 212 of the client system 102 and the server system 104 shown in FIG. 1 may be utilized to transfer user control commands from the client system 102 to the server system 104, and to transfer video game rendering information from the server system 104 to the client system 102.

The computing device 200 may also include or communicate with certain input device(s) 214 such as a keyboard, mouse or other pointing device, pen, voice input device, touch input device, etc. Such input devices 214 may be manipulated by the user to enter, initiate, or otherwise originate user control commands while playing video games. The computing device 200 may also include or communicate with output device(s) 216 such as a display element, speakers, printer, or the like. For example, during operation of the computing device 200, a display element may be utilized for playback of video game content. All of these devices are well known in the art and need not be discussed at length here.

Figure 3:
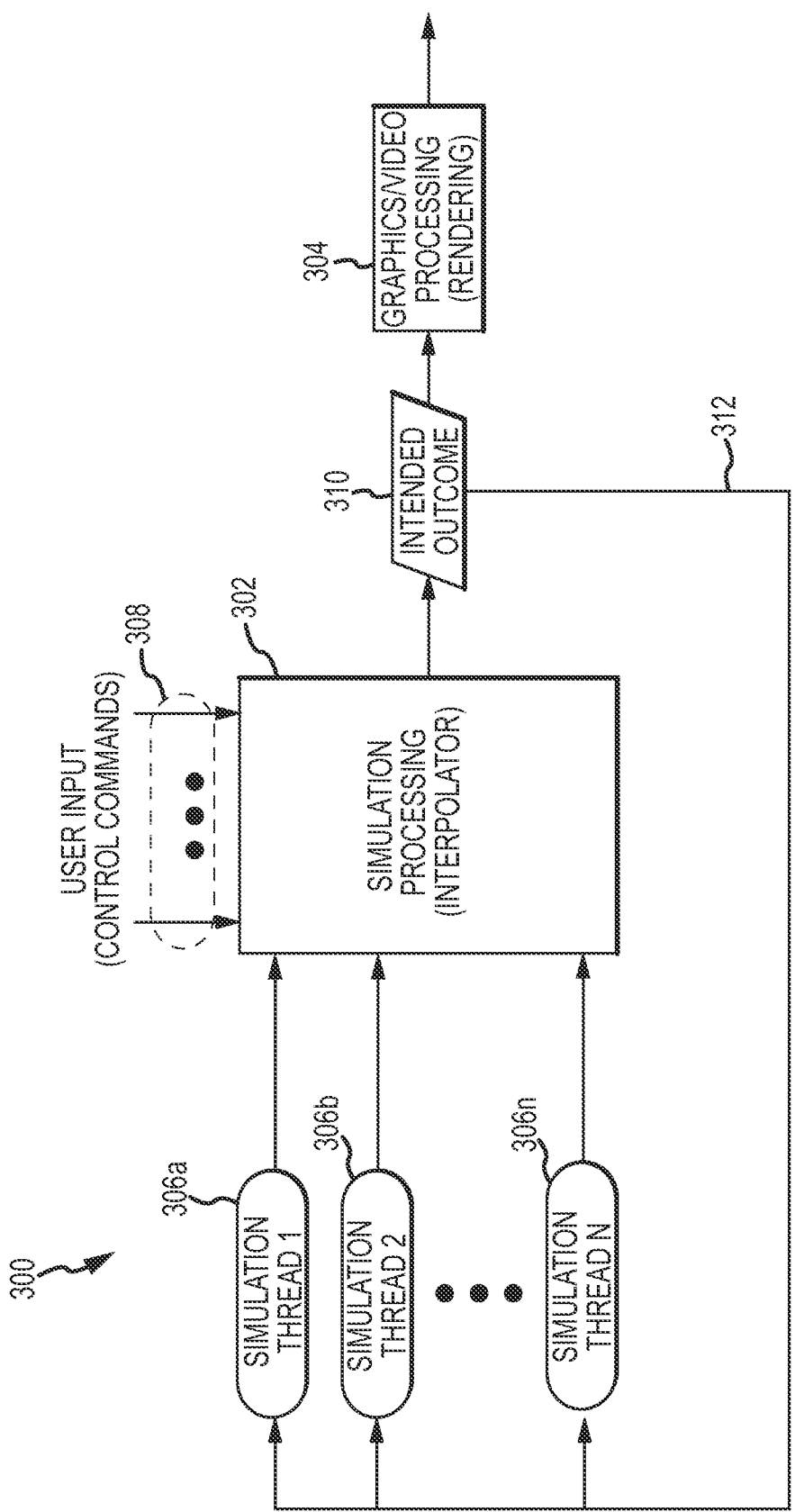
FIG. 3 is a schematic representation that illustrates exemplary modules of a video processing system.

FIG. 3 is a schematic representation that illustrates exemplary modules of a video processing system 300. In certain embodiments, the modules depicted in FIG. 3 are realized in the server system 104 (FIG. 1) and the related functionality of the modules is performed by the server system 104. The illustrated embodiment of the video processing system 300 includes, without limitation, a simulation processing module 302 and an optional graphics/video processing module 304. The simulation processing module 302 may also be referred to herein as an interpolator, for reasons that will become apparent from the following description.

The simulation processing module 302 cooperates with and analyzes one or more concurrent simulation threads 306 for an interactive video application, such as a video game application. Accordingly, FIG. 3 depicts the simulation threads 306 as inputs to the simulation processing module 302. As explained in more detail below, each simulation thread 306 corresponds to a predicted outcome of the video application, and the simulation threads 306 may be executed in an ongoing manner to anticipate how the video application might continuously respond to user input. The video processing system 300 can concurrently execute, terminate, create, and/or update any number of simulation threads 306 in an ongoing manner. The vertical ellipses in FIG. 3 are intended to represent this flexible and potentially dynamic feature of the video processing system 300.

The simulation processing module 302 also receives user input 308 (e.g., control commands), which is intended to control the interactive video application. As a simple example, the user input 308 may correspond to only one binary variable, such as a "Run/Walk" command, a "Shoot" command, a "Start/Stop" command, or the like. As a more complicated example, the user input 308 may correspond to a plurality of different input variables or parameters in any combination, and a given variable need not be restricted to only two possible values. In this regard, the user input 308 for a video game might include, without limitation, some or all of the following: "Move Right" command; "Fly" command; "Speed Value" command; "Replenish Life" command; "Move Down" command; and the like. It should be appreciated that this short list is far from exhaustive, and this list is not intended to limit or otherwise restrict the scope or application of the embodiments presented herein. The horizontal ellipses in FIG. 3 are intended to represent the flexible and potentially dynamic feature of the video processing system 300.

As explained in more detail below with reference to FIG. 4, the simulation processing module 302 processes at least some of the received user input 308 and one or more of the simulation threads 306 to obtain an intended outcome 310 of the game application. Ideally, the intended outcome 310 corresponds to the accurate status, state, or condition of the video application as influenced by the received user input 308. Notably, the intended outcome 310 is generated in a manner that considers a measured, estimated, or calculated client-to-server time delay such that the presentation timing of the intended outcome 310 (as perceived by the end user) is as accurate and glitch-free as possible. The intended outcome 310 may serve as an input to the graphics/video processing module 304. Thus, the graphics/video processing module 304 can render the intended outcome 310 in accordance with a desired format that is suitable for presentation at the client system.

The intended outcome 310 may also serve as feedback 312 to any or all of the simulation threads 306. This feedback 312 may be utilized to update a simulation thread 306, to initiate the termination of a simulation thread 306, or the like. Moreover, one or more new simulation threads (not shown) could be created in response to the generation of the intended outcome 310 if so desired.

In certain embodiments, the modules depicted in FIG. 3 reside at a server system that supports a hosted interactive video game application that is presented to a user of a client system (see FIG. 1). In other embodiments, however, the modules depicted in FIG. 3 could reside at a client system such that the techniques and processes described herein are performed in a localized manner. In yet other embodiments, the modules depicted in FIG. 3 and/or the functionality described in more details below could be distributed across a plurality of computing devices (e.g., distributed across a client system and a server system). For example, the rendering of the video game content could be performed at the client system if so desired to save hardware costs associated with the server system and/or to allow flexibility in the rendering options at the client system. As explained above, a server-based implementation of the simulation processing module 302 is desirable to compensate for the client-to-server delay lag that is experienced during hosted video game play.

Figure 4:
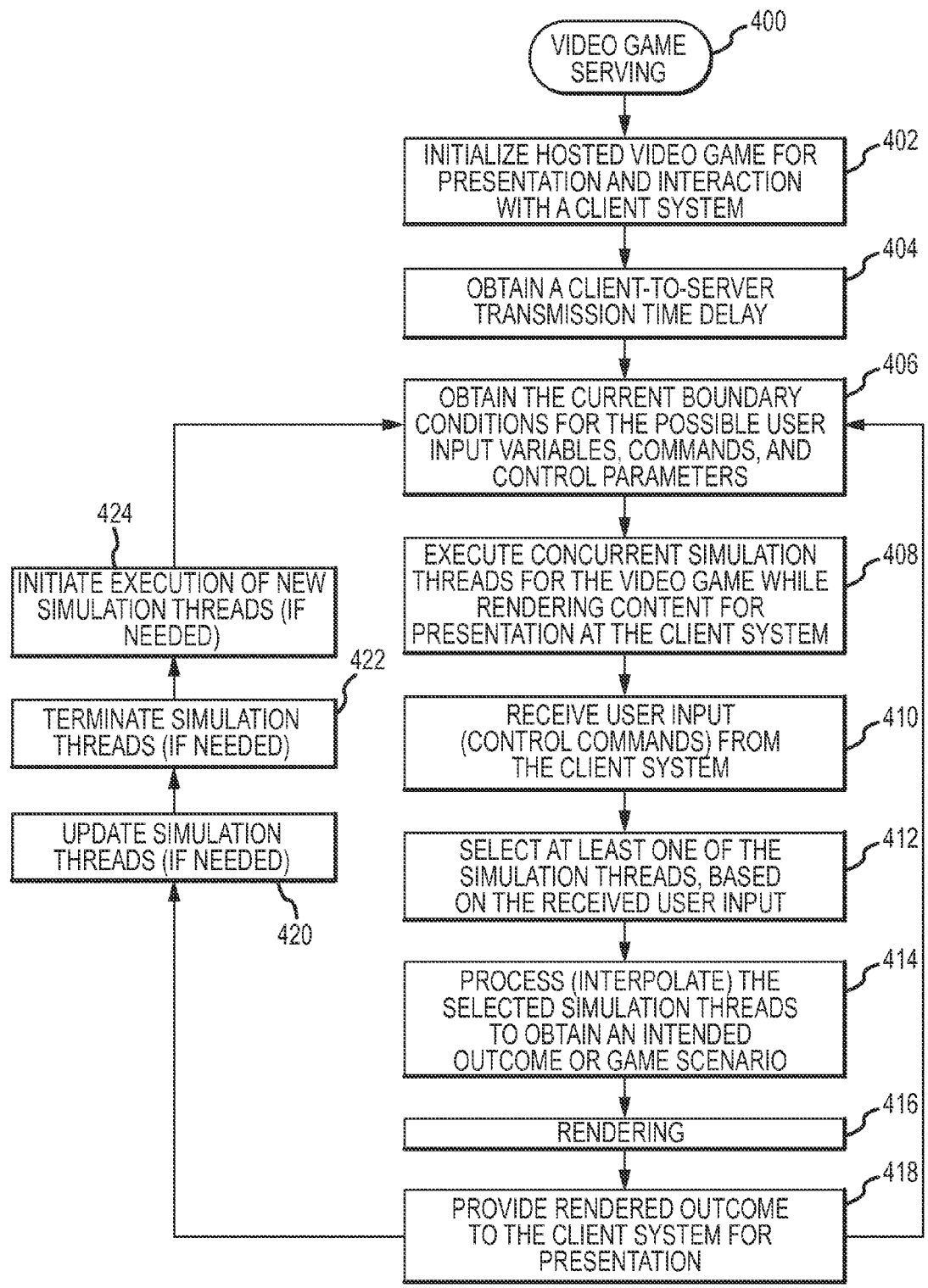
FIG. 4 is flow chart that illustrates an embodiment of a video game serving process.

FIG. 4 is flow chart that illustrates an embodiment of a video game serving process 400. Although not always required, the process 400 is described in the context of a client-server environment. The various tasks performed in connection with the process 400 may be performed by software, hardware, firmware, or any combination thereof. For illustrative purposes, the following description of the process 400 may refer to elements mentioned above in connection with FIGS. 1-3. In practice, portions of the process 400 may be performed by different elements of the described system, e.g., a processor, a video or graphics module, a data communication interface, or the like. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The process 400 may begin by initializing a hosted video game application for presentation and interaction with a client system (task 402). Task 402 may be associated with the launching of the video game application at the client system and, in response to the launching, creation of one or more processing threads at the server system. Consequently, the server system executes a server-side video game application, and the client system executes a corresponding client-side video game application that cooperates with the server-side video game application. The processing threads maintained at the server system represent at least some of the game manipulation, updating, execution, and video data processing needed to provide the interactive video game content to the client system in a continuous and ongoing manner that appears seamless to the user of the client system.

The process 400 may obtain a client-to-server transmission time delay (task 404) using any suitable technique, protocol, or technology. For example, the process 400 may generate a network ping or an equivalent diagnostic signal to check the round trip response time between the server system and the client system, and then calculate the one-way transmission time based on the results of the ping. In this regard, the ping may return a round trip time value, and the desired time delay can be estimated to be one-half of the round trip time value. As another example, task 404 could utilize certain synchronization methodologies and techniques that are typically associated with the Network Time Protocol (NTP). Of course, other approaches could be leveraged depending upon the particular system implementation and as appropriate for the specific embodiment. As explained above, the communication of user control commands between the client system and the server system may be associated with the measured or determined transmission time delay. Accordingly, the process 400 may save and use the time delay value (and update the time delay value as needed) in the manner described in more detail below.

At any given moment during execution, the video game application may be susceptible to one or more user input variables, control commands, adjustment parameters, or other input data that might influence the game playing trajectory, the game status, an outcome, the next game scenario, or the like. For example, if the process 400 receives a "Stop Walking" control command, then the video game application will respond to cause the game character to stop walking. As another example, if the process receives a succession of "Shoot" control commands, then the video game application will respond to cause a weapon to fire. The process 400 contemplates at least some of the possible user inputs and control commands for purposes of creating, executing, and updating simulation threads for the video game application. In certain embodiments, the process 400 need not contemplate all possible future scenarios (doing so might require an excessive amount of processor resources). Accordingly, the process 400 may obtain current boundary conditions for at least some of the possible user input variables (task 406).

As used here, the "boundary conditions" for an interactive video application represent the ranges or limits of the user input values contemplated by the video processing system. In this regard, an individual user control command may have a defined range of possible values (e.g., a minimum value and a maximum value) relative to a specified coordinate system or frame of reference, or relative to the current status or scenario of the video application. For example, the boundary conditions for movement of a video game character may include minimum and maximum velocity values. As another example, the boundary conditions associated with a walking motion may be defined as follows: three steps in the X direction; five steps in the Y direction; and two steps in the negative X direction. It should be appreciated that the particular boundary conditions, the number of applied boundary conditions, and the user input associated with boundary conditions may vary from one system to another, and from one interactive video application to another. For example, and without limitation, any or all of the following user input types could be limited by corresponding boundary conditions: movement; position; rotation; acceleration; velocity; pitch; yaw; roll; flight elevation; height; depth; "point of view" direction; character status parameters (such as attentiveness, life points, health points, action points, mind points, mana, magic, growth, vulnerability, hunger, ammunition, selected weapon(s), etc.); character actions (such as standing, sitting, throwing, punching, kicking, grasping, jumping, etc.); weapon firing; weapon aiming; focusing; character talking; and the like. It should be appreciated that the above list is merely exemplary, and that the number and types of user control commands will be determined by the specific video game application that is being executed.

Figure 5:
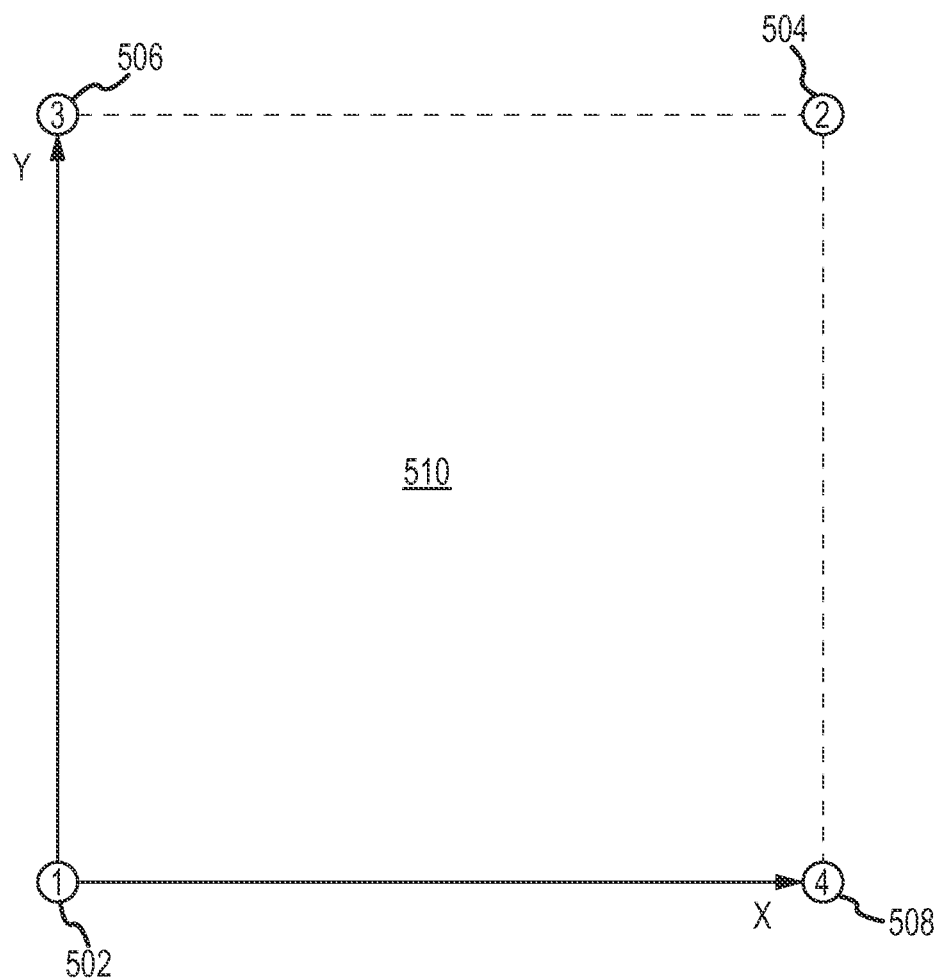
FIG. 5 is a diagram that depicts boundary conditions for user control commands associated with a simple video game application.

FIG. 5 is a diagram that depicts boundary conditions for user control commands associated with a simple video game application. This example assumes that a video game character can be controlled to move in the X direction (represented by the horizontal axis) and in the Y direction (represented by the vertical axis). Moreover, this example assumes that the game character can only move in the positive X direction and the positive Y direction relative to its current position. For this particular scenario, at least four discrete boundary conditions can be identified. The first boundary condition 502 corresponds to the minimum value of movement in the X direction combined with the minimum value of movement in the Y direction (e.g., no movement). The second boundary condition 504 corresponds to the maximum possible value of movement in the X direction combined with the maximum possible value of movement in the Y direction. The third boundary condition 506 corresponds to the minimum value of movement in the X direction combined with the maximum value of movement in the Y direction. The fourth boundary condition 508 corresponds to the maximum value of movement in the X direction combined with the minimum value of movement in the Y direction. The dashed lines in FIG. 5 complete a "box" that conceptually represents the possible range of user input values for this particular example. Thus, the four boundary conditions define the outermost range of the potential user input values, and any actual user input will correspond to the perimeter of the box or to the interior area 510 of the box.

Returning to FIG. 4, the process 400 may continue by creating and executing a plurality of concurrent simulation threads for the interactive video application (task 408). Each of the simulation threads corresponds to: a predicted, anticipated, or estimated future outcome of the video application; a predicted state, condition, or status of the video application; a potential scenario for the video application (such as a game playing situation for a video game application); or the like. The following description uses the term "predicted outcome" in a general manner to encompass and contemplate any or all of these possible contexts for the simulation threads. In practice, each simulation thread corresponds to a predicted outcome that may be influenced by (or dictated by) certain user control commands associated with a video game application. Moreover, at least some of the simulation threads are executed in accordance with the boundary conditions obtained during task 406. For example, a simulation thread may correspond to a simulation of the video game application based on an anticipated user control command that indicates a boundary condition value. Referring to FIG. 5, four concurrent simulation threads could be established and executed to simulate the manner in which the video application would respond to each of the four designated boundary conditions.

In certain embodiments, the simulation threads are created and executed in a manner that is influenced by, determined by, or otherwise controlled by the transmission time delay obtained during task 404. For example, the simulation threads could be executed in a way that contemplates a time offset that compensates for the transmission time delay. As another example, the simulation threads could be referenced or synchronized (relative to the client system) to reduce, minimize, or eliminate the transmission time delay.

Generally, in certain implementations, the transmission time delay will dictate how far ahead and/or how far away the simulation threads will be executing, based upon how much distance could be covered in the transmission time delay. For lower transmission delay times, the simulations will be less divergent and the bounding conditions will be closer to the intended outcome. It should be noted that simulations could be executed based on a delay time that is significantly more than the actual transmission delay time, however this will increase the duration of user feedback (frames of video, audio content, etc.) that is shown or played before the inputs are handled. Conversely, using a simulation delay value much less than the transmission delay time would require the user to act apparently further in advance of when the action was desired.

Moreover, there may be special scenarios where the simulation delay will differ significantly from the transmission delay time (such as a volatile transmission delay time, or to reduce/limit processing overhead). For example, in the case that the transmission delay time is greater than one frame, the server will need to render or transmit model information before the input for that frame is available. In such scenarios, there are three general methods that may be used to render these frames: "nominal input(s)", "current input(s)", and the "happy path". Nominal inputs suppose that no active input is received; this will be appropriate for some action games with discrete inputs. Current inputs uses the last received input values to determine the rendered content, this will generally be most suitable to driving and flying programs with analog inputs. "Happy path" will assume the inputs necessary to keep the player alive/healthy and will require the interpolator to have some information about which parameters are related to the success of the player. In some implementations, these different methods may be blended in ratios to minimize the error, or maximum error. In some preferred embodiments, if a simulation thread iteration is less computationally expensive than interpolating, a simulation thread will be used to determine this state.

The simulation threads are executed and maintained while rendering the actual video game content for presentation at the client system. Conceptually, therefore, each simulation thread may be considered to be a separate instantiation of the video game content that is running in the background. Moreover, each simulation thread may be considered to be a predicted or future representation of the video game content. Accordingly, the different concurrent simulation threads correspond to a number of different video game outcome paths that splinter from the actual and current video game scenario, wherein the simulation threads are generated with the assumption that certain user input has already been received and acted upon. These concurrent simulation threads may run in the background in a continuous manner until the process 400 receives actual user input (e.g., control commands), wherein the received user input is intended to control the interactive video application (task 410). As mentioned above, the received user input may originate at the client system in response to some user action, such as manipulation of a user interface element to initiate a control command.

The process 400 may analyze or handle the received user input in an appropriate manner, and select at least one of the simulation threads based on the received user input (task 412). In certain embodiments, task 412 identifies one or more simulation threads that are deemed to match or closely match the received user input. In other words, the process 400 may analyze the received user input to determine which simulation thread best emulates the game scenario that corresponds to the actual received user input. In accordance with the simple example depicted in FIG. 5, if the received user input matches one of the boundary conditions, then task 412 might select the simulation thread that corresponds to the matching boundary condition. In such a situation, the selected simulation thread should accurately reflect the intended outcome. In contrast, if the actual received user input falls somewhere within the interior area 510 (FIG. 5), which represents a non-simulated state, then task 412 may strive to identify and select the boundary condition (and associated simulation thread) that is closest to the user input. In addition, task 412 might select the boundary condition (and associated simulation thread) that is the next-closest to the user input. It should be appreciated that the process 400 could leverage any suitable matching technique, algorithm, or methodology to select which simulation thread (or threads) to consider during task 412.

The process 400 may continue by processing the selected simulation threads as needed to obtain an intended outcome or game scenario (task 414). The intended outcome will be influenced by, or generated in response to, the user input received during task 410. In certain implementations, calculation and generation of the intended outcome may also be influenced by, or generated in response to, the transmission time delay obtained during task 404. In practice, task 414 may perform interpolation on the selected simulation threads to obtain the intended outcome from the selected simulation threads (see FIG. 3). Thus, the process 400 may interpolate the intended outcome from at least one of the simulation threads. Depending on the particular embodiment and the current operating conditions, the interpolation performed during task 414 could utilize only one simulation thread, two simulation threads, or any number of simulation threads if so desired. Moreover, although the interpolation performed during task 414 preferably utilizes each of the simulation threads selected during task 412, the use of all selected simulation threads is not required.

After task 414 obtains the desired outcome, the process 400 may render the intended game scenario (task 416) and provide the rendered outcome to the client system (task 418) for presentation to the user. In alternative embodiments, some or all of the rendering could be performed at the client system, based on updated model information provided by the server system. At this point, the intended game scenario represents the currently active video game thread, and the process 400 may return to task 406 to continue in the manner described above. As depicted in FIG. 4, task 418 may also lead to one or more additional tasks that relate to the handling of the simulation threads. In this regard, one or more of the existing simulation threads may be updated, modified, or adjusted if needed (task 420). The updating that occurs during task 420 is influenced by the intended outcome because the simulation threads are updated to contemplate additional user input that are supposed to control the currently active video game thread. Whether or not any simulation thread is updated by task 420, the process 400 may terminate execution of one or more of the simulation threads if needed (task 422). In other words, a simulation thread can be closed if it no longer represents a realistic or viable game trajectory, if the user control commands associated therewith are no longer applicable to the updated game scenario, or the like. For example, if the current game scenario is such that the game character is unable to fly, then a simulation thread that predicts a "Fly" control command can be terminated.

Whether not any simulation thread is terminated by task 422, the process may consider whether or not to initiate the execution of a new concurrent simulation thread (task 424). Task 424 may be desirable to contemplate new outcomes or game scenarios that are now possible due to the currently active status of the video application. In other words, a new simulation thread can be created such that it corresponds to a predicted outcome of the video application that is influenced by the intended outcome obtained during task 414. For example, if the intended outcome and the current game scenario result in the game character falling into a dark hole, then a new simulation thread may be opened and maintained to contemplate a new possible user input that corresponds to a "Flashlight On" control command. As another example, one or more new simulation threads may be created and executed after the game character has experienced a "Level Up" enhancement.

As depicted in FIG. 4, the process 400 may be performed continuously in a dynamic manner to react to any ongoing changes to the video game application. In particular, the process 400 manipulates, updates, terminates, and/or creates concurrent simulation threads in response to real time user interaction with the currently rendered and presented video game content. The predictive nature of the concurrent simulation threads enables the video processing system to compensate for data transmission delay experienced between the client system and the server system.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of processing video information, the method comprising:
   executing, with at least one processor of a server, a plurality of concurrent simulation threads for an interactive video game application, wherein each of the concurrent simulation threads corresponds to a different predicted outcome that is influenced by different possible user control commands associated with the interactive video game application;
   receiving, at the server, actual user input intended to control the interactive video game application, the actual user input corresponding to a user control command initiated at a client system, wherein receiving the actual user input from the client system is associated with a transmission time delay between the client system and the server;
   selecting, with the at least one processor of the server, a matching simulation thread from the plurality of concurrent simulation threads, wherein the selecting is based on the received actual user input to determine which of the plurality of concurrent simulation threads best emulates a game scenario that corresponds to the received actual user input;
   processing, with the at least one processor of the server, the matching simulation thread to obtain an intended actual outcome of the video game application, wherein the processing interpolates the intended actual outcome from the matching simulation thread in response to the received actual user input and in response to the transmission time delay to compensate for client-to-server delay lag associated with playing the interactive video game application; and
   providing the actual intended outcome of the video application for presentation to a user.

2. The method of claim 1, further comprising:
updating one or more of the concurrent simulation threads after obtaining the actual intended outcome of the video game application, wherein the updating is influenced by the actual intended outcome of the video game application.

3. The method of claim 1, further comprising:
terminating execution of one or more of the concurrent simulation threads after obtaining the actual intended outcome of the video game application.

4. The method of claim 1, further comprising:
initiating execution of a new concurrent simulation thread after obtaining the actual intended outcome of the video game application, wherein the new concurrent simulation thread corresponds to a predicted outcome of the video game application that is influenced by the actual intended outcome of the video game application.

5. The method of claim 1, further comprising:
obtaining boundary conditions for possible user input variables, wherein the concurrent simulation threads are executed in accordance with the obtained boundary conditions.

6. A video processing system comprising:
a communication interface configured to receive user control commands initiated at a client system at an actuation time, wherein the user control commands are associated with user interaction with a video game application hosted by the video processing system;
a processing architecture having at least one processor; and
a non-transitory computer readable medium operatively associated with the processing architecture, the computer readable medium comprising executable instructions that, when executed by the processing architecture, cause the processing architecture to perform a method comprising:
   executing a plurality of concurrent simulation threads for the interactive video game application, wherein each of the concurrent simulation threads corresponds to a different predicted state that is influenced by different possible user control commands associated with the video game application;
   receiving, by the communication interface, actual user input intended to control the interactive video game application, the actual user input corresponding to a user control command initiated at the client system, wherein receiving the actual user input from the client system is associated with a transmission time delay between the client system and the video processing system;
   selecting a matching simulation thread from the concurrent simulation threads, wherein the selecting is based on the received actual user input to determine which of the concurrent simulation threads best emulates a game scenario that corresponds to the received actual user input;
   processing the matching simulation thread to obtain an actual intended outcome of the video game application, wherein the processing interpolates the intended actual outcome from the matching simulation thread in response to the received actual user input and in response to the transmission time delay to compensate for client-to-server delay lag associated with playing the interactive video game application;

rendering the actual intended outcome of the video game application; and providing the rendered actual intended outcome to the client system.

7. The system of claim 6, wherein:

the video processing system is implemented with a server system; and the server system communicates with the client system using a data communication network.

8. The system of claim 6, wherein the executable instructions cause the processing architecture to update one or more of the concurrent simulation threads after interpolating the actual intended outcome of the video game application, wherein the updating is influenced by the actual intended outcome.

9. The system of claim 6, wherein the executable instructions cause the processing architecture to initiate execution of a new concurrent simulation thread after interpolating the actual intended outcome of the video game application, wherein the new concurrent simulation thread corresponds to a predicted outcome of the video game application that is influenced by the actual intended outcome of the video game application.

10. The system of claim 6, wherein:

the executable instructions cause the processing architecture to obtain boundary conditions for possible user control commands; and the concurrent simulation threads are executed in accordance with the obtained boundary conditions.

* * * * *